United States Patent Office 3,711,514
Patented Jan. 16, 1973

3,711,514
HIGHLY FLUORINATED ALKYL ESTERS OF TRI-
MELLITIC ACID ANHYDRIDE AND METHOD
FOR THEIR PRODUCTION
James E. Quick, Pittsburgh, Pa., assignor to the United
States of America as represented by the Secretary of
the Navy
Filed Feb. 12, 1970, Ser. No. 10,942
Int. Cl. C07c 63/32
U.S. Cl. 260—346.3                                   6 Claims

ABSTRACT OF THE DISCLOSURE

Highly fluorinated ester-anhydrides and diacids are formed by reacting an acid anhydride chloride or a diacid with a perfluorinated aliphatic alcohol. The fluorinated esters will cure epoxy resins and form plastics which exhibit a low degree of wettability, a low degree of surface friction, and a low degree of water absorption. The fluoro-ester-cured epoxy resin plastics are useful in sonar dome and hydrofoil coatings, molded plastic articles, fuel tank linings, and aircraft adhesives.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The subject matter of this invention concerns highly fluorinated ester compounds. More specifically, it concerns the use and formation of highly fluorinated pendant chain ester anhydrides and acids, which may be used as epoxy curing agents.

There are many uses of epoxy resins which occur in the presence of water and require a high order of reliability, and in which the insidious effects of the environment present a major uncertainty regarding long-term performance. The use of organic adhesives to bond the wing structures of supersonic aircraft illustrates the point, for such structures are engineered to withstand the anticipated levels of dynamic loading with an adequate safety margin. However, after the aircraft has been soaked repeatedly from rainfall, the adhesive bonds become weakened by water saturation and structural reliability is diminished.

The class of polymers termed "epoxies" varies widely in response to water, depending upon the particular type of resin and curing agent employed. In general, the strongest epoxy plastics absorb the most water and are most likely to be damaged. Some ultrastrong epoxies may absorb as much as 10% water by weight and spall into flakes upon drying. The common epoxy resins saturate with about 3% weight gain.

Three aromatic diamines have recently become available commercially which are fluoriated on the aromatic rings: tetrafluoro-meta-phenylenediamine, tetrafluoro-para-phenylene-diamine and 4,4'-diaminooctafluorobi-phenyl. Of the three, the meta isomer

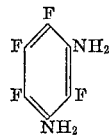

is most suitable for use as a curing agent for epoxy resins and has been used to advantage as a curing agent for 1,4-cyclohexane diepoxide. This small-molecule diepoxide has been used to produce plastics with exceptionally high compressive strengths, but gives a poor performance in water immersion studies (see Curve A in the figure).

The strength of the 1,4-cyclohexane diepoxide system reflects a tight molecular network which contains a high concentration of polar groups, specifically hydroxyl and amino groups. These groups have a high affinity for water which interferes with the secondary cohesive forces arising from their presence. Improved water resistance results when the strength-essential bonding regions of the plastic are diluted. For this reason, the inert portions of the plastic molecular structure should be as hydrophobic as possible, and epoxy concentration in the resin should be in proportion to the strength requirement.

SUMMARY OF THE INVENTION

Among polymeric materials, those containing a large percentage of fluorocarbon in the molecular structures are perhaps the least affected by water. This invention provides fluorinated compounds which may be attached to epoxy resin networks through at least one covalent chemical bond, as opposed to a physical inclusion or entrapment of fluorocarbon materials within the resin. The inclusion of such fluorocarbons within the epoxy network results in plastic surfaces having non-wetting characteristics, low water absorption properties, and low surface friction values.

Some of the more promising systems of the present invention are being evaluated in filament-wound structures subjected to dynamic fatigue in water. These systems also have potential use as aircraft adhesives, fuel tank linings, self-lubricating plastic gears, barrier films and coatings, and numerous other applications for which a combination of the unique properties of epoxies with those of fluorocarbons would be advantageous.

STATEMENT OF THE OBJECTS OF THE INVENTION

It is an object of this invention to provide a new and useful class of highly fluorinated pendant chain ester anhydrides and diacids.

Another object of this invention is to provide fluorocarbon curing agents for epoxy resins which will impart to the cured resin a resistance to the effects of water.

A further object of this invention is to provide fluorocarbon curing agents for epoxy resins which will impart to the cured resins relatively lower surface friction coefficients, lower water absorption properties, and improved non-wetting characteristics.

A still further object of the present invention is to provide methods of preparing highly fluorinated curing agents for use in epoxy resins.

BRIEF DESCRIPTION OF THE DRAWING

The figure illustrates water absorption characteristics of fluoroepoxy plastics.

DESCRIPTION OF THE PREFERRED EMBODIMENTS

The present invention concerns fluoroaliphatic anhydride esters and fluoroaliphatic acid esters. It also relates to their use as curing agents for epoxy resins. The use of epoxy curing agents having both a highly fluorinated aliphatic carbon chain and a difunctional curing ability results in unique epoxy resins which are exceptionally hydrophobic. In some cases the fluorocarbon chain is part of the plastic network structure upon which the strength of the plastic depends, and in all cases it is attached to the network by at least one covalent chemical bond.

Both the fluorinated ester anhydrides and diacids of this invention subsequently react with polyglycidyl polyethers via a curing reaction well known in the art. They are usually in a powder form and require moderate temperatures and mixing to become dissolved into the polyethers. With the Bisphenol-A type of diglycidyl ether they reacted relatively slow up to the gel stage and produced a strong plastic after total cure.

Normally, the pendant fluorocarbon chain of the esters contains not more than 12 carbon atoms, a terminal $CF_3$ group also being helpful in rendering the resultant epoxy resin hydrophobic. Esters containing saturated fluoroaliphatic groups with from 2 to 12 carbon atoms are of particular interest since they have low energy. oleophobic and hydrophobic properties. Fluorinated chains containing more than 12 carbon atoms usually have no better properties, are increasingly expensive, and are thereby not preferred.

The saturated fluoroaliphatic carbon groups are preferably of the perfluoroaliphatic type and they may include open chain, linear or branched as well as alicyclic radicals. In this invention the fluorocarbon radicals are provided by perfluorinated alcohol compounds. The amount of fluorination being limited primarily by the availability of the various perfluoroaliphatic alcohols. Exemplary of the perfluorinated alcohols useful in this invention are 1H,1H-perfluoropropanol, 1H,1H-perfluorobutanol, 1H,1H-perfluorohexanol, perfluoro-4-ethylcyclohexanol, 1H,1H-perfluorooctanol, perfluoro-ethylhexanol, 1H,1H-perfluorododecanol, and the like. Because of their availability, the preferred perfluoroaliphatic alcohols are 1H,1H-heptafluorobutanol-1 and 1H,1H-pentadecafluorooctanol.

Since the ester linkage between an organic acid and a fluorinated alcohol is exceptionally stable [Faurote, P D. and O'Rear, J. G., Ind. & Eng., Chem. 49 (No. 2):189 (1957)], the attachment of pendant chains of fluorocarbon to curing agents via esterification reactions is an attractive process. A suitable reaction is

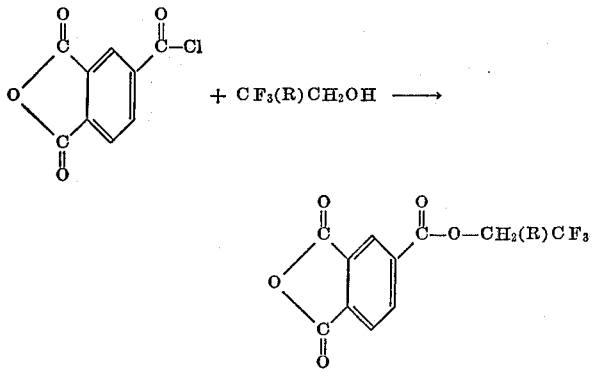

where R is a divalent perfluoroaliphatic carbon chain containing 2–12 $CF_2$ groups. The greater reactivity of the acid chloride group in esterification allows the production of the anhydride ester without major loss of the anhydride function—which can be used subsequently to cure an epoxy resin.

The following are examples of the techniques used to form the fluoroaliphatic anhydride esters:

EXAMPLE 1

Equimolar amounts of 1H,1H-heptafluorobutanol-1 and trimellitic anhydride acid chloride were heated to 100° C. for 24 hours. The evolution of HCl gases roughly indicated the rate of reaction of the alcohol. After 24 hours no further HCl appeared to be present and the heptafluorobutyl trimellitate anhydride product was obtained in 45% yield by recrystallization from benzene and ligroin. The elemental analysis and physical characteristics are: $C_{13}F_7H_5O_5$—Theory (percent): carbon, 41.7; hydrogen, 1.34; fluorine, 35.6. Found (percent): carbon, 41.7; hydrogen, 2.71; fluorine, 36.1. Melting point: 79° C. Major infrared bands: 1861, 1791, 1743, and 1234 cm.$^{-1}$.

The reaction time range is from 1 to 30 hours depending upon the extent to which it is desired to carry the reaction to completion. Generally, the presence of HCl gases indicates that the alcohol is being consumed and, likewise, when the reaction is substantially completed, no more HCl gas will be evolved. It may also be desirable to include more than an equimolar amount of the acid chloride.

EXAMPLE 2

Equimolar amounts of 1H,1H-pentadecafluorooctanol-1 and trimellitic anhydride acid chloride (a surplus of the chloride is helpful) were heated to react within a range of 80°–140° C. for a time sufficient to consume the alcohol—as in Example 1. A temperature of 120° C. for 4 hours gave a yield of 50%. The resultant pentadecafluorooctyl trimellitate anhydride was purified by recrystallization from benzene and ligroin. The elemental analysis and physical characteristics are: $C_{17}F_{15}H_5O_5$—Theory (percent): carbon, 35.6; hydrogen, 0.87; fluorine, 49.6. Found (percent): carbon, 35.0; hydrogen, 1.93; fluorine, 50.2. Melting point: 109° C. major infrared bands: 1863, 1796, 1747, 1243, and 1212 cm.$^{-1}$.

Because of the relatively low melting points, these anhydrides are easily dispersed into common epoxy resins. An initial incompatibility, when present, faded as the curing reactions progressed. The curing ability of the anhydrides was tested in small aluminum planchets (1 inch dia. dishes). Compositions which were considered to be approximately stoichiometric were heated on a hot plate until compatible at about 200° C., and final cure was effected during 24 hours in an oven at 140° C. The planchets were covered during the cure to prevent excessive sublimation of the curing agents.

Alternately, a polyacid chloride can be partially esterified and the excess acid chloride groups hydrolyzed to make a polyacid curing agent with pendant fluoroester:

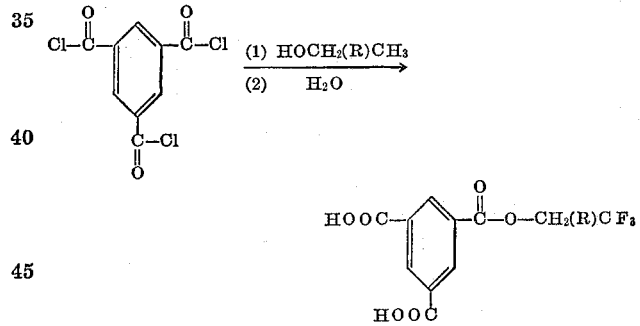

where R is a divalent perfluoroaliphatic carbon chain containing 2–12 $CF_2$ groups.

This procedure, however, is not as attractive in general as that of the anhydride reaction in Examples 1 and 2 because polyesterification occurs, making isolation of the desired product difficult. Also, the physical characteristics of the diacids are not as favorable as those of the anhydrides for use as epoxy curing agents.

EXAMPLE 3

Equimolar quantities of trimesoylchloride (the chloride may be present in greater than equimolar amounts) and 1H,1H-pentadecafluorooctanol-1 were mixed, heated and stirred at a reaction temperature of 80–140° C. for 2–12 hours. The reaction was continued until the alcohol was consumed—its disappearance being followed by use of a gas chromatograph. The product was washed with warm water to hydrolyze excess acid chloride. The resulting white solid was soluble in acetone, except for a small amount of triester which was removed by filtration. Water was added to the acetone solution until all solids had precipitated. Most of this precipitate was then dissolved in methanol. The diester, which was insoluble, was removed by filtration. Dilution of the methanol solution with water gave a 35% yield of the desired monoester, which has sufficient purity for use as an epoxy curing agent. The elemental analysis and physical characteristics are: $C_{17}F_{15}H_7O_6$—Theory (percent): carbon, 34.5; hydrogen, 1.18; fluorine, 48.3. Found (percent): carbon, 34.9; hydrogen, 1.91; fluorine, 50.4. Neutral equiv.: theory, 296; found, 315. Melting point: 230° C. Major infrared bands: 1750, 1702, 1245, and 1210 cm.$^{-1}$.

The material is somewhat difficult to use as a curing agent because of its high melting point and insolubility in epoxy resins at low temperature. At high temperatures it cures a Bisphenol-A epoxy readily, however, and the resulting plastic has only a slight affinity for water.

EXAMPLE 4

The monoester of trimesic acid and 1H,1H-heptafluoro-butanol-1 was prepared from trimesoyl chloride and the fluoroalcohol by reaction of equimolar amounts in toluene solvent for 2–6 hours under reflux with aluminum chloride catalyst (the use of a catalyst is optional). After solvent removal, the purification was essentially the same as that for the octyl ester in Example 3, except for the change necessitated by the solubility of both the mono and diesters in methanol. The diester precipitated first when methanol was diluted with water. The elemental analysis and physical characteristics are: $C_{13}F_7H_7O_6$—Theory (percent): carbon, 39.8; hydrogen, 1.79; fluorine, 33.9. Found (percent): carbon, 40.6; hydrogen, 2.93; fluorine, 34.0. Melting point: 293° C. Major infrared bands: 1750, 1710, and 1235 cm.$^{-1}$.

This ester melts at a higher temperature than the octyl derivative in Example 3 and must also be used at high temperatures to cure epoxies.

Water immersion tests were run on samples of prior art fluoroepoxies and on Examples 1–4 of the present invention (see Table I). The samples were prepared by heating the epoxy resins on a hot plate to approximately 200° C. at which point both the ester anhydride and diacid were dissolved into the resins by moderate mixing. The ratios with the octyl groupings were 55 parts of curing agent to 45 parts of resin. They were about 50:50 with the butyl grouping. The mixtures were then poured into 1 inch diameter aluminum dishes and cooled. The dishes were placed into an oven, covered, and cured at 140° C. for 24 hours. After curing the discs (1 inch diam. x ⅛ inch thick), the fluoroepoxy-curing agent systems were cooled and immersed in distilled water at ambient temperature. Periodically they were removed, quickly dried on the surface, and weighed to determine weight increases due to internally absorbed water. The figure shows the water absorption behavior curves during 5 weeks of immersion for the plastics listed in Table I.

TABLE I

| Curve | Epoxy | Curing agent |
| --- | --- | --- |
| A—Prior art high strength cured epoxy system. | 1,4-cyclohexane diepoxide. | Tetrafluoro-m-phenylenediamine. |
| B—Prior art high strength cured epoxy system. | Fluoro-resorcinol diglycidyl ether.[1] | Do. |
| C—Example 4 cured system. | Liquid Bisphenol-A type. | Fluorobutyl ester of trimesic acid (Example 4). |
| D—Example 1 cured epoxy system. | ___do___ | Fluorobutyl ester of trimellitic anhydride (Example 1). |
| E—Example 3 cured epoxy system. | ___do___ | Fluorooctyl ester of trimesic acid (Example 3). |
| F—Example 2 cured epoxy system. | ___do___ | Fluorooctyl ester of trimellitic anhydride (Example 2). |

[1] Prepared in accordance with Air Force Materials Laboratory, Technical Report AFML-TR-13, Part III, April 1967.

The data in the figure indicates several effects which will probably be observed, generally, as fluorocarbon is introduced into epoxy plastics: (a) long perfluoroaliphatic chains are more effective than an equal concentration of short chains in making the plastics less water absorptive; (b) high strength plastics may be improved by the use of fluoroaromatic curing agents, but they remain exceptionally water absorptive; (c) plastics made from fluoroaromatic amines continue to absorb water over long time spans, while those made from fluoroaliphatic anhydrides and acids quickly reach a plateau and absorb slowly thereafter; (d) water absorption is roughly inversely proportional to fluorine content and directly proportional to polar group content; and (e) the effectiveness of water-absorption suppression by fluorocarbon is dependent upon the types of polar groups present in the cured plastic, for example, cured plastics with predominantly ester linkages are suppressed more readily than those with a mixture of hydroxyl and amino groups.

Free-cast surfaces produced by epoxies containing the fluoroaliphatic carbon chains of this invention frequently have water contact angles greater than 90° C. Water is shed rapidly from these surfaces, and they are usually durable. Practical use may be made of this property to produce nonwetting coatings or to protect seems of joints which are bonded with common adhesives. Additionally, the surfaces have friction coefficient values nearly the same as those of high-density polyethylene, and lower than those of most unfluorinated plastics (Bowers, R. C. and Murphy, C. M., "Status of Research Report 6466," January 1967). Many of the highly fluorinated epoxy resins are especially useful because of the ease with which they can be cast into molds to produce self-lubricating articles.

Obviously, many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A composition of matter of the formula

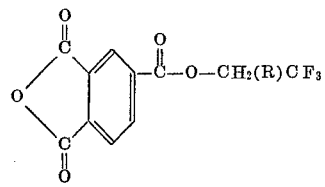

where R is a divalent saturated perfluoroaliphatic carbon chain containing 2–12 $CF_2$ groups.

2. 1H,1H-heptafluorobutyl trimellitate anhydride.

3. 1H,1H-pentadecafluorooctyl trimellitate anhydride.

4. A method of preparing a perfluoroaliphatic trimellitic anhydride whereby about equimolar quantities of trimellitic anhydride acid chloride and a 1H,1H-saturated perfluoroaliphatic alcohol with the fluoro aliphatic chain having two to thirteen carbon atoms are mixed and heated to a temperature within the range of 80–140° C. for 1–30 hours.

5. The method of claim 4 whereby said quantities are heated for a time until the alcohol has been consumed.

6. The method of claim 4 whereby the said acid chloride is present in excess of the equimolar amount.

References Cited

UNITED STATES PATENTS 3,437,671   4/1969   Sandler et al. _____ 260—346.3
3,238,184   3/1966   Stephens et al. _____ 260—346.3

OTHER REFERENCES

Griffith and Quick: Advances in Chem. Series (1970) (based on symposium of Apr. 3 and 4, 1968) pp. 8–15, vol. 92.

ALEX MAZEL, Primary Examiner

B. DENTZ, Assistant Examiner

U.S. Cl. X.R.

260—475, 2 EP